United States Patent [19]
Hayashi

[11] Patent Number: 5,154,941
[45] Date of Patent: Oct. 13, 1992

[54] METHOD FOR STRETCHING DOUGH

[75] Inventor: Torahiko Hayashi, Utsunomiya, Japan

[73] Assignee: Rheon Automatic Machinery Co., Ltd., Utsunomiya, Japan

[21] Appl. No.: 634,245

[22] Filed: Dec. 26, 1990

Related U.S. Application Data

[62] Division of Ser. No. 555,209, Jul. 20, 1990.

[51] Int. Cl.$^5$ .............................................. A21C 3/02
[52] U.S. Cl. .................................. 426/496; 426/502; 425/135; 425/363
[58] Field of Search ............... 426/496, 502; 425/135, 425/141, 363, 373, 367

[56] References Cited

U.S. PATENT DOCUMENTS

| | | | |
|---|---|---|---|
| 2,735,379 | 2/1956 | Stiles | 426/502 |
| 4,056,346 | 11/1977 | Hayashi | 425/373 |
| 4,266,923 | 5/1981 | Curnes | 425/356 |
| 4,692,110 | 9/1987 | Hayashi | 425/373 |
| 4,731,008 | 3/1988 | Hayashi et al. | 425/373 |

FOREIGN PATENT DOCUMENTS

| | | |
|---|---|---|
| 128015 | 12/1984 | European Pat. Off. |
| 211669 | 2/1987 | European Pat. Off. |
| 285442 | 10/1988 | European Pat. Off. |
| 836988 | 9/1990 | European Pat. Off. |
| 408286 | 1/1991 | European Pat. Off. |

*Primary Examiner*—Jeanette Hunter
*Assistant Examiner*—Helen Pratt
*Attorney, Agent, or Firm*—Guy W. Shoup; David W. Heid

[57] ABSTRACT

A method and an apparatus for stretching dough are provided. The method includes the steps of disposing upstream and downstream conveyors serially, driving the downstream conveyor faster than the upstream conveyor, disposing a roller above and spaced apart from the conveyors, rotating the roller, and reciprocating the roller a predetermined distance over the conveyors conveying the dough to uniformly stretch it to a desired thickness. The apparatus is provided to work the method.

5 Claims, 7 Drawing Sheets

FIG. 7

METHOD FOR STRETCHING DOUGH

This application is a division of application Ser. No. 07/555,209, filed Jul. 20, 1990.

BACKGROUND OF THE INVENTION

1. Field of Invention

This invention relates to a method and apparatus for stretching plastic material, and, more particularly, to a method and apparatus for stretching dough for bread or confectionery.

2. Description of Prior Art

Before now plastic materials or dough for bread or confectionery have been continuously stretched by supplying the dough to the clearance between a conveyor and a fixed roller.

Although such a fixed roller is not used in it, U.S. Pat. No. 4,692,110 discloses an apparatus for stretching dough in which a plurality of conveyors, each being driven at a different speed, are serially disposed. In it a roller mechanism comprising a plurality of rollers that are freely rotatable about their axes, and that constitute a straight path, is located above and spaced apart from the serially disposed portion of the conveyors. Since in these prior apparatuses the conveying speed of the downstream conveyor is higher than that of the upstream conveyor, and the dough being conveyed by the serially disposed conveyors is gently held and stretched by the rollers that are advancing downstream or reciprocating over the surface of the dough, the dough is effectively stretched.

However, the roller mechanism of this U.S. patent has a heavy and complex structure. Since this roller mechanism is heavy, the mechanism can perform only 40 strokes per minute when the stroke distance is 500 mm, and the structural complexity requires high production, maintenance, and repair costs. Therefore, an apparatus for stretching dough that is simple, functions steadily, and that has low production costs, has been desired.

SUMMARY OF THE INVENTION

This invention provides a method and apparatus for stretching dough in which a plurality of serially disposed conveyors, and a roller that is rotatable about its axis and that is reciprocated over the downstream conveyor and the upstream conveyor, are arranged.

This invention provides a method comprising the steps of disposing an upstream conveyor, and a downstream conveyor that is serially positioned relative to the upstream conveyor, driving the downstream conveyor faster than the upstream conveyor dough being conveyed by the conveyors, disposing a roller above and spaced apart from the conveyors, rotating the roller, and reciprocating the roller a predetermined distance above a path stretching over the conveyors.

This invention also provides a dough-stretching apparatus comprising a plurality of serially-located conveyors, the speed of the downstream conveyor being faster than that of the adjacent upstream conveyor, and a roller located above and spaced apart from the conveyors' surfaces so that the roller can reciprocate a predetermined distance above a path stretching over the conveyors, the peripheral speed of the roller being made to be the same as the conveying speed of the most downstream conveyor.

This invention further provides a dough-stretching apparatus comprising a plurality of serially located conveyors, the speed of the downstream conveyor being faster than that of the adjacent upstream conveyor, and a plurality of rollers arranged in the front and rear directions relative to the conveying direction of the conveyors and located above and spaced apart from the conveyors' surfaces so that the rollers can reciprocate a predetermined distance above a path stretching over the conveyors, the peripheral speed of the rollers being made to be the same as that of the conveying speed of the downstream conveyor.

This invention further provides a dough-stretching apparatus comprising three serially-located conveyors, the speed of the downstream conveyor being faster than that of the adjacent upstream conveyor, and two rollers arranged in the front and rear directions relative to the conveying direction of the conveyors and located above and spaced apart from the conveyors' surfaces so that the downstream roller can reciprocate a predetermined distance above a path stretching over the downstream and intermediate conveyors and the upstream roller can reciprocate a predetermined distance above a path stretching over the intermediate and upstream conveyors, the peripheral speed of the downstream roller being the same as the conveying speed of the downstream conveyor and the peripheral speed of the upstream roller being the same as the conveying speed of the intermediate conveyor.

By this invention dough is stretched by using the effect of the different speeds of the two conveyors. Namely, the speed of the downstream conveyor is made to be faster than that of the upstream conveyor, and when the roller moves in the upstream direction the roller first roughly stretches the incoming dough, and, when the roller moves in the downstream direction, the roller further stretches the dough to provide a uniformly flattened dough.

Since the roller is always rotating, the roller, when it moves in the upstream direction, and because the peripheral speed of the roller is faster than the conveying speed of the upstream conveyor, effectively pulls the dough into the clearance between the roller and the conveying surface of the conveyor.

Similarly, the roller, when it moves in the downstream direction, stretches the dough, and even thick dough material can be instantaneously stretched. In addition, since the roller reciprocates by rolling over the dough between the upstream conveyor and the downstream conveyor at a great many strokes per minute, the flattened dough does not slip over the downstream conveyor even when the roller is positioned on the dough that is on the upstream conveyor. The roller's reciprocating speed is faster than the speed of the downstream conveyor. Thus, the dough can be smoothly stretched by the apparatus of this invention, compared to the prior art apparatuses. The peripheral speed of the roller is the same as that of the conveying speed of the downstream conveyor.

Further, by providing a sensor to automatically sense the thickness of the dough being supplied onto the upstream conveyor, the apparatus precisely stretches the dough to any desired thickness.

It has been accepted that to stretch dough that has a height H to produce a dough strip that would have the same thickness as the distance D between the roller and conveying surface of the downstream conveyor, the following formula should be met in the stretching operation:

$$V_1/V_2 = D/H$$

wherein $V_1$ represents the conveying speed of the upstream conveyor, and $V_2$ represents the conveying speed of the downstream conveyor.

By the apparatus of this invention, dough is effectively stretched when the above formula is met.

It is therefore an object of this invention to provide a method of stretching dough in which a roller is reciprocated over the upstream conveyor and the downstream conveyor, over the surface of the dough that is continuously conveyed by a downstream conveyor that is disposed serially with an upstream conveyor, while the roller is reciprocated by rolling on the surface of the dough. The dough is first stretched by the difference of the speed between the upstream and downstream conveyors, and is further stretched by the roller. Since the dough is uniformly compressed by the roller that is repeatedly reciprocating over the surface of the dough, the gluten tissue of the dough does not suffer any excessive compression from the roller, and thus the dough is effectively and uniformly stretched.

Another object of this invention is to provide an apparatus for working the above-mentioned method. The apparatus comprises an upstream conveyor, a downstream conveyor that is disposed serially with the upstream conveyor, the conveying speed of the downstream conveyor being higher than that of the upstream conveyor, a roller rotatable about its axis and located above the conveyors, and means for reciprocating the roller by a predetermined distance along a moving path spaced apart from the conveying surfaces of the upstream conveyor and the downstream conveyor.

Since the apparatus of this invention only requires a roller or rollers, a plurality of conveyors, and means for reciprocating the roller, the structure of the apparatus is simple. This leads to low production costs in making the apparatus.

PREFERRED EMBODIMENTS OF THE INVENTION

Figure 1:
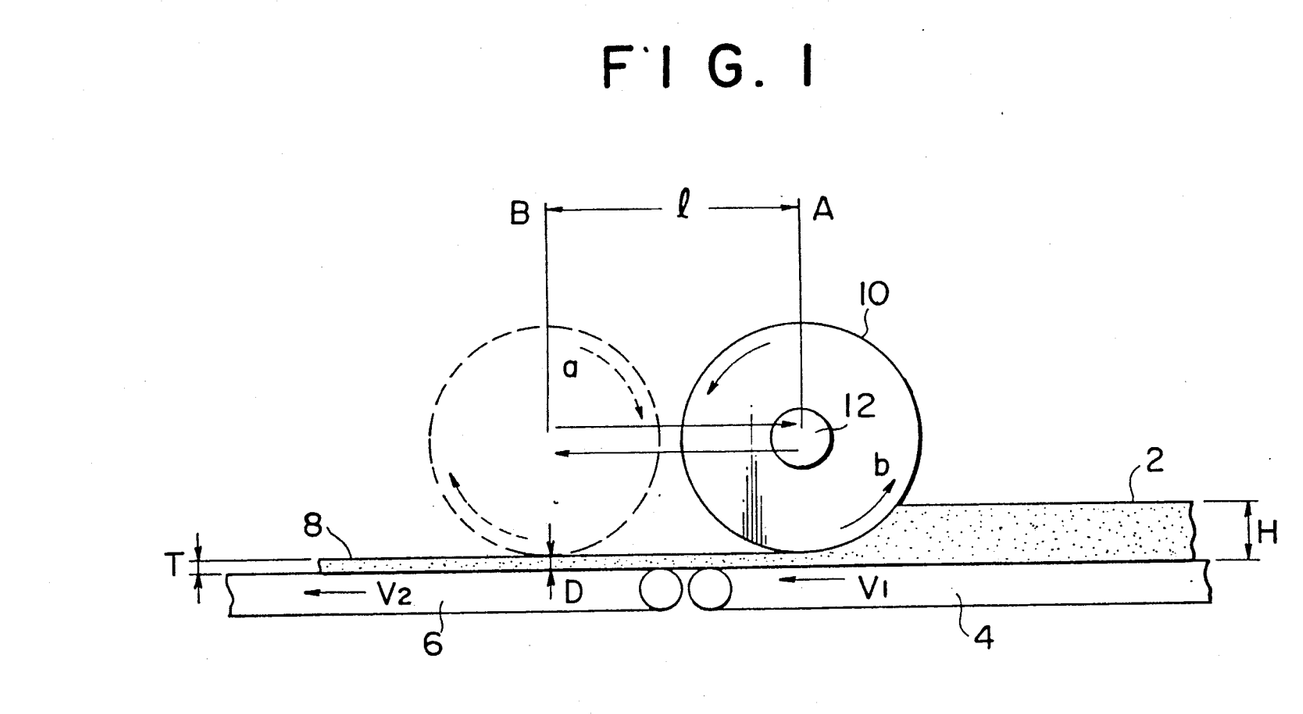
FIG. 1 is a schematic side-elevational view, partly in section, illustrating a first embodiment of this invention.

FIG. 1 shows a first embodiment of the present invention. In the drawing the number 2 represents the dough supplied to an upstream conveyor 4 and the number 8 shows the stretched dough located on a downstream conveyor 6. The direction of the upstream conveyor is shown by an arrow $V_1$, and, similarly, the the direction of the downstream conveyor is shown by an arrow $V_2$. $V_1$ and $V_2$ also show the speed of the upstream and downstream conveyors, respectively. The reference mark H shows the thickness of the dough material supplied and the reference mark T shows the thickness of the stretched dough 8. The speed relation between the upstream conveyor and the downstream conveyor is always $V_1 < V_2$.

A roller 10 is mounted above the juncture of the upstream and the downstream conveyors. The clearance D between the roller and the downstream conveyor's surface is adjustable and the roller reciprocates a predetermined distance l on a path that stretches over the two conveyors. The roller is rotated at a speed that is about the same as, or just the same as, the conveying speed of the downstream conveyor.

The arrow a shows the rotational direction of the roller when it moves in the upstream direction A, while the arrow b shows the rotational direction when it moves in the downstream direction B. The reference number 12 shows the shaft of the roller 10.

Figure 5:
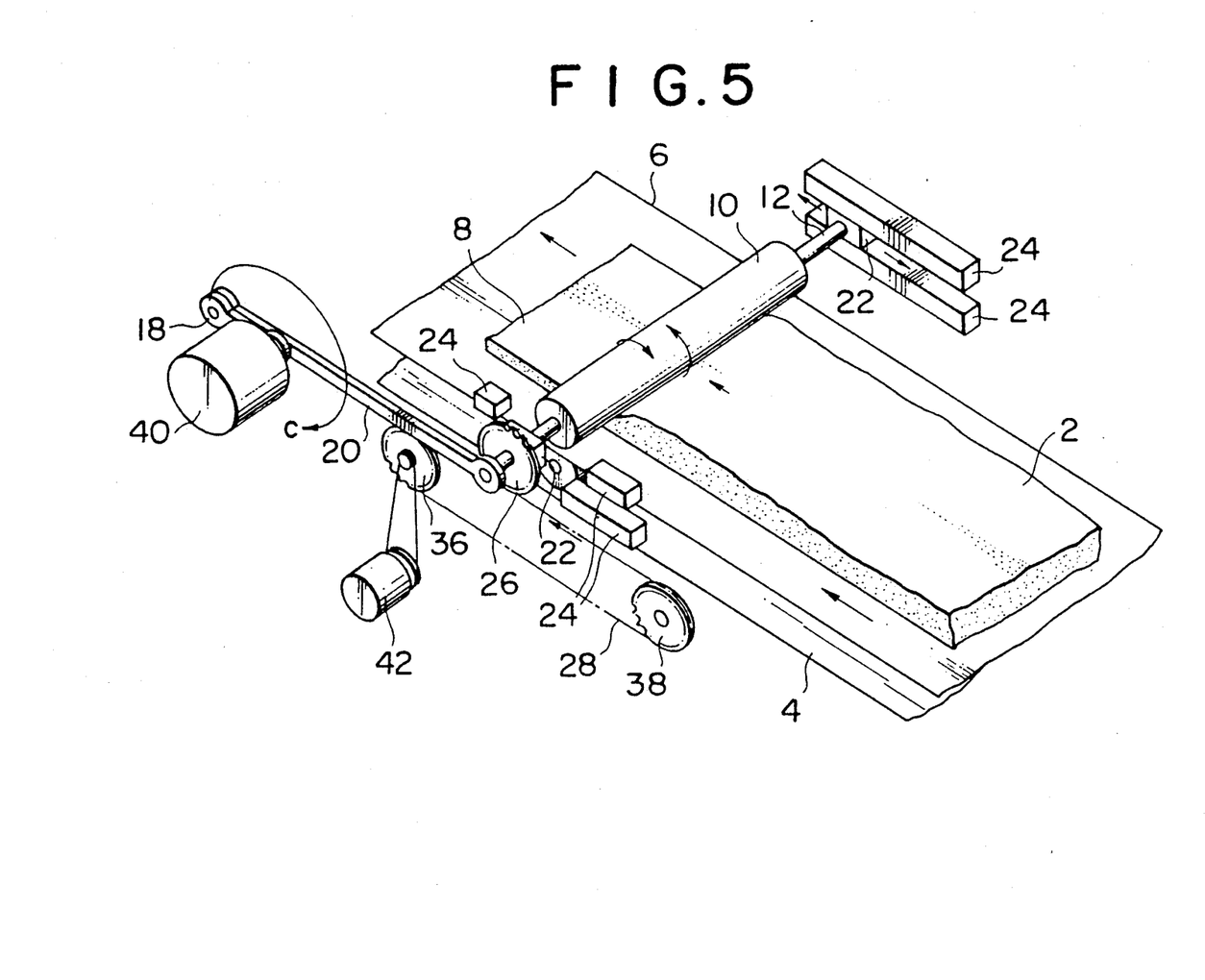
FIG. 5 is a perspective view, illustrating the reciprocating means located at the juncture of the two conveyors.
Figure 6:
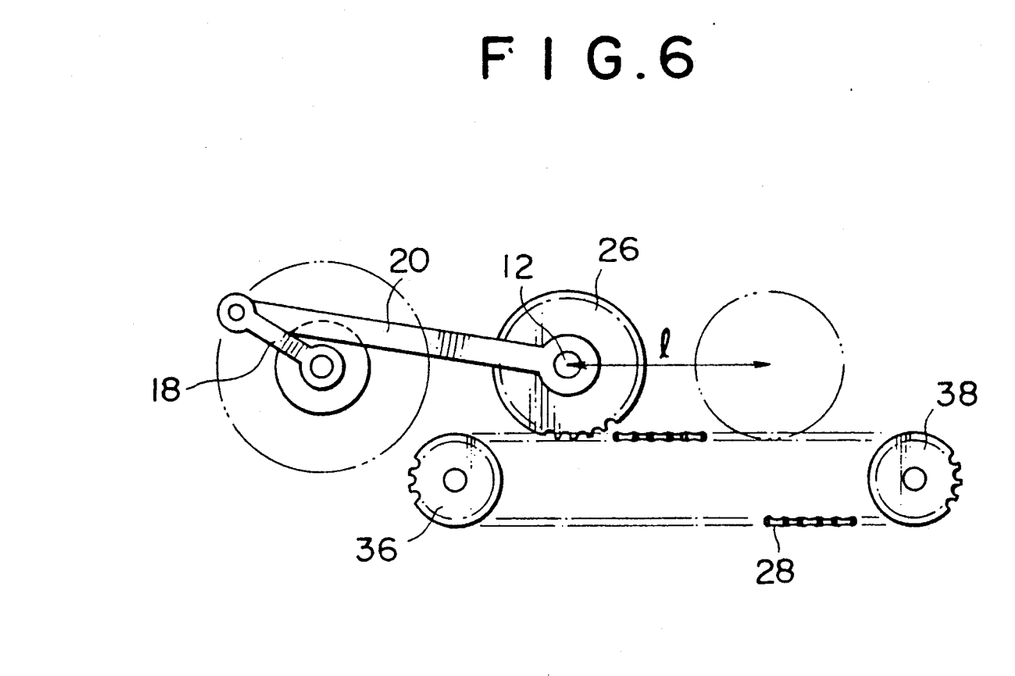
FIG. 6 is a schematic side-elevational view of the reciprocating means.

In FIG. 6 a sprocket 26 is shown. It is fixed to one end of the shaft 12. The pitch and the circumference of the sprocket are usually the same as those of the roller 10. The sprocket 12 rotates by meshing with a chain 28 and this rotational movement is transmitted to the roller. The chain 28 is trained over sprockets 36 and 38, and the sprocket 36 is driven by a motor 42 as shown in FIG. 5. The speed and the direction of the chain are usually the same as those of the downstream conveyor. The number 20 is a crank rod. It moves the shaft 12, and the number 18 is a crank, driven by a motor 40 as shown in FIG. 5. The roller moves the distance l as the crank rotates.

The above structure is more specifically shown in FIG. 5. Namely, the sprocket 26 is fixed to one end of the shaft 12 to which the roller 10 is fixed. Guide members 24 are located at the opposite sides of the conveyors 4, 6 along the entire path of the roller 10. A slide 22 is fixed to each end of the shaft so that the shaft can slidably reciprocate in the space defined by the guide members. As already mentioned, the shaft reciprocates as the crank rod is rotated. The number 40 shows a motor for rotating the crank 18 and the number 42 shows a motor for rotating the sprocket 36.

A first embodiment will now be explained by reference to FIG. 1. The dough material 2 is placed on the upstream conveyor 4. The dough 2 is conveyed toward the downstream conveyor 6 at a speed $V_1$ and transferred to the downstream conveyor 6. The dough thus supplied is pulled into the clearance between the roller and the conveyor surface in the direction of the downstream conveyor because the roller rotates when it moves upstream at a speed greater than that speed $V_1$ of the upstream conveyor. Thus the dough is stretched and transferred to the downstream conveyor. The dough, on the downstream conveyor, is further uniformly stretched by the roller that rolls on the dough, to form a uniformly stretched dough 8.

Since the roller 10, when moving upstream on the upstream conveyor 4, forcibly pulls the dough under the roller toward the downstream conveyor, the dough can be stretched eight times thinner than the thickness of dough stretched by conventional fixed rollers. This shows one of the specific advantages of the present invention.

The dough can be stretched based on the relationship of the height or thickness H of the dough, the clearance D between the roller and the conveying surface of the downstream conveyor, the conveying speed $V_1$ of the upstream conveyor, and the conveying speed $V_2$ of the downstream conveyor, namely, based on the following formula:

$$V_1/V_2 = D/H$$

Therefore, if the thickness H varies, the conveying speed $V_1$ of the upstream conveyor must be changed.

Figure 7:
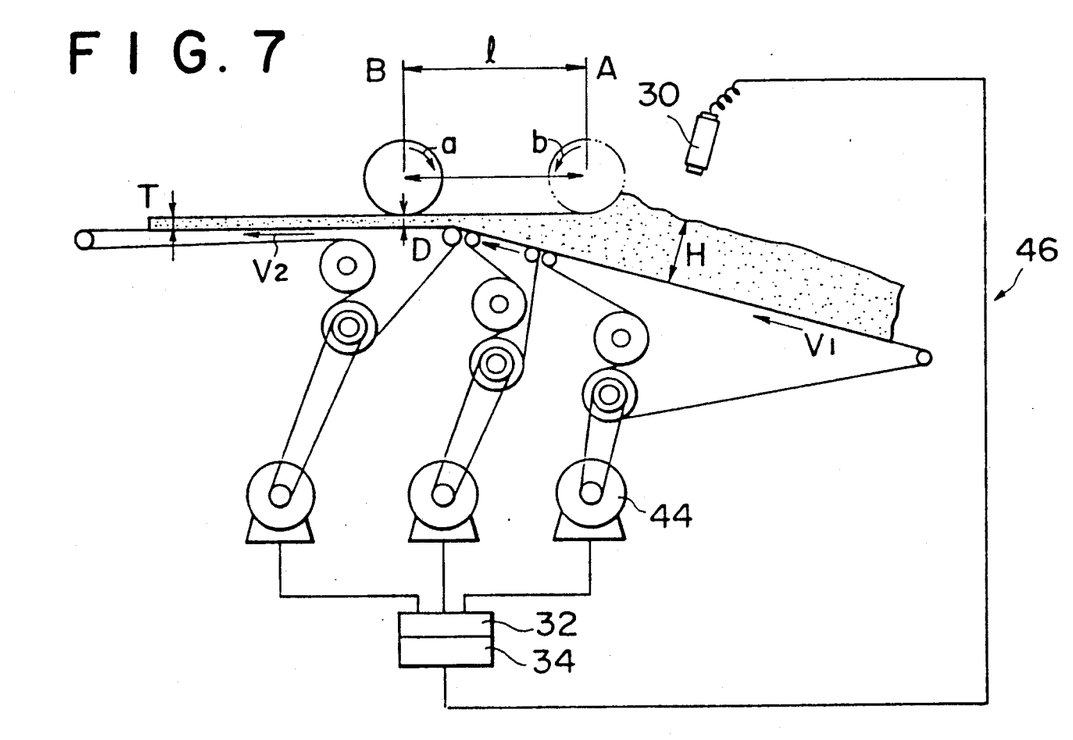
FIG. 7 is a schematic side-elevational view of a fifth embodiment of this invention.

The thickness H can be automatically measured. A thickness sensing device 46 is shown in FIG. 7. The sensor 30, to sense the level of the supplied dough, receives, for instance, a laser beam reflected by the dough's upper surface. The level signal is supplied to an inverter 32 through a calculator 34. The inverter controls the frequency that controls a motor 44. The motor determines the speed $V_1$ of the upstream conveyor.

In this embodiment the operation is carried out under the following conditions:
Speed $V_1$ of the upstream conveyor: about 2 m/min
Speed $V_2$ of the downstream conveyor: about 10 m/min
Height H of the dough to be stretched: about 50 mm
Distance D of the clearance: about 10 mm
Diameter of the roller 10: about 100 mm
Stroke of the reciprocating movement of the roller 10: about 500 mm
The number of the reciprocating movements of the roller 10: about 200/min (400 strokes/min)

In this embodiment the formula $V_1/V_2=D/H$, using the above numbers, can be expressed as 2 m/10 m = 10 mm/50 mm. The thickness T of the dough 8 after stretching was about 10 mm. If the height H of the dough to be stretched changes from 50 mm to 40 mm, the formula $V_1/V_2=D/H$ can be expressed as 2.5 m/10 m = 10 mm/40 mm. Therefore, the speed $V_1$ of the upstream conveyor is changed to about 2.5 m/min, so that the thickness T of the stretched dough 8 is always kept at about 10 mm during the operation.

It should be noted that in this embodiment the number per minute of reciprocating movements of the roller 10 is about 200, that is, 400 strokes per minute. This shows a remarkable contrast to the number of strokes of the roller mechanism of U.S. Pat. No. 4,692,110, its strokes being only 40/min, under the same stroke distance of 500 mm. This advantage derives from the simple structure of the present invention. Since the number of strokes is a great many, the dough is uniformly and gently stretched, and its gluten tissue is not destroyed.

Figure 2:
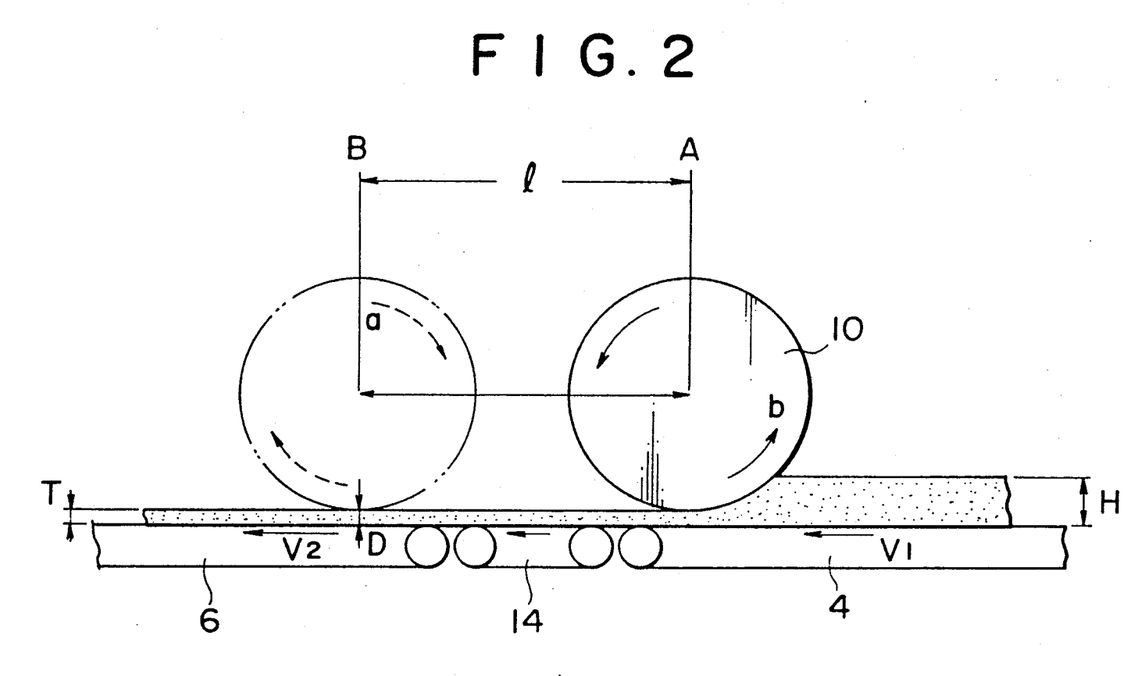
FIG. 2 is a schematic side-elevational view, partly in section, illustrating a second embodiment of this invention.

Referring to FIG. 2, which shows a second embodiment of this invention, an intermediate conveyor 14 is located between the upstream conveyor and the downstream conveyor. The speed of this intermediate conveyor is made to be between the speed of the upstream conveyor $V_1$ and that of the downstream conveyor $V_2$.

The peripheral speed of the roller in this case is also the same as the conveying speed of the downstream conveyor 6. However, the roller, when it moves upstream, pulls the incoming dough in the downstream direction on the upstream conveyor 4 and the intermediate conveyor 14, and the dough is stretched by the roller on the three conveyors, each moving at a different speed. Namely, the intermediate conveyor advances faster than the upstream conveyor and the downstream conveyor advances faster than the intermediate conveyor. Since the dough is stretched on three conveyors, the dough can be more smoothly stretched than in the case of the first embodiment, where only two conveyors are used. This means that even dough having much plasticity can be uniformly stretched.

Figure 3:
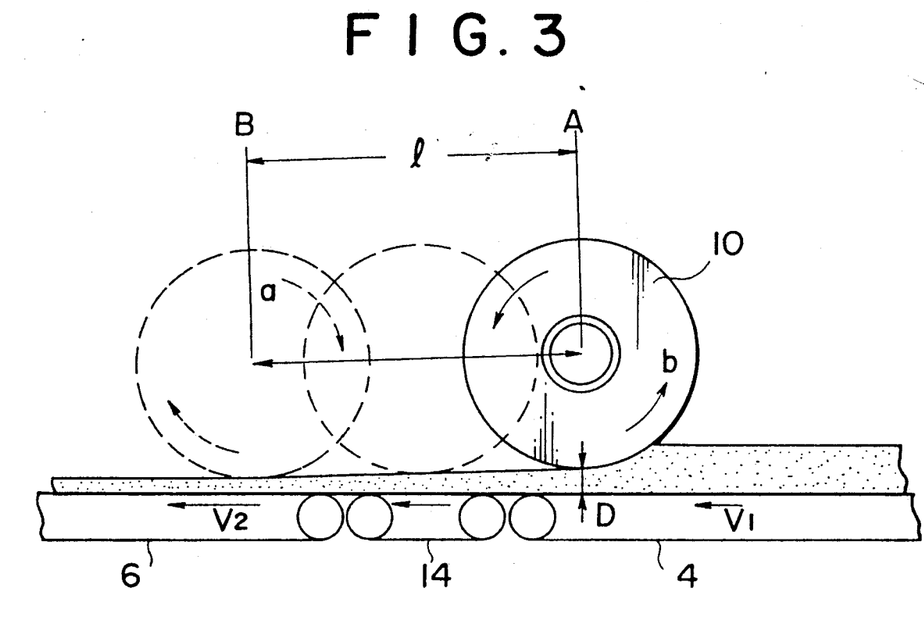
FIG. 3 is a schematic side-elevational view illustrating a third embodiment of this invention.

A third embodiment of this invention is shown in FIG. 3. In this embodiment the roller reciprocates in a slanting relation to the three conveyors 4, 14, and 6. Namely, the clearance D becomes gradually narrower in the direction of the downstream conveyor 6. This is made possible by inclining the reciprocating direction of the roller relative to the surfaces of the conveyors. Experiments show that, since the initial impact of the roller, when it moves in the upstream direction against the dough on the upstream conveyor can be alleviated, the gluten structure of the dough is protected, and bread of good quality can be obtained.

Figure 4:
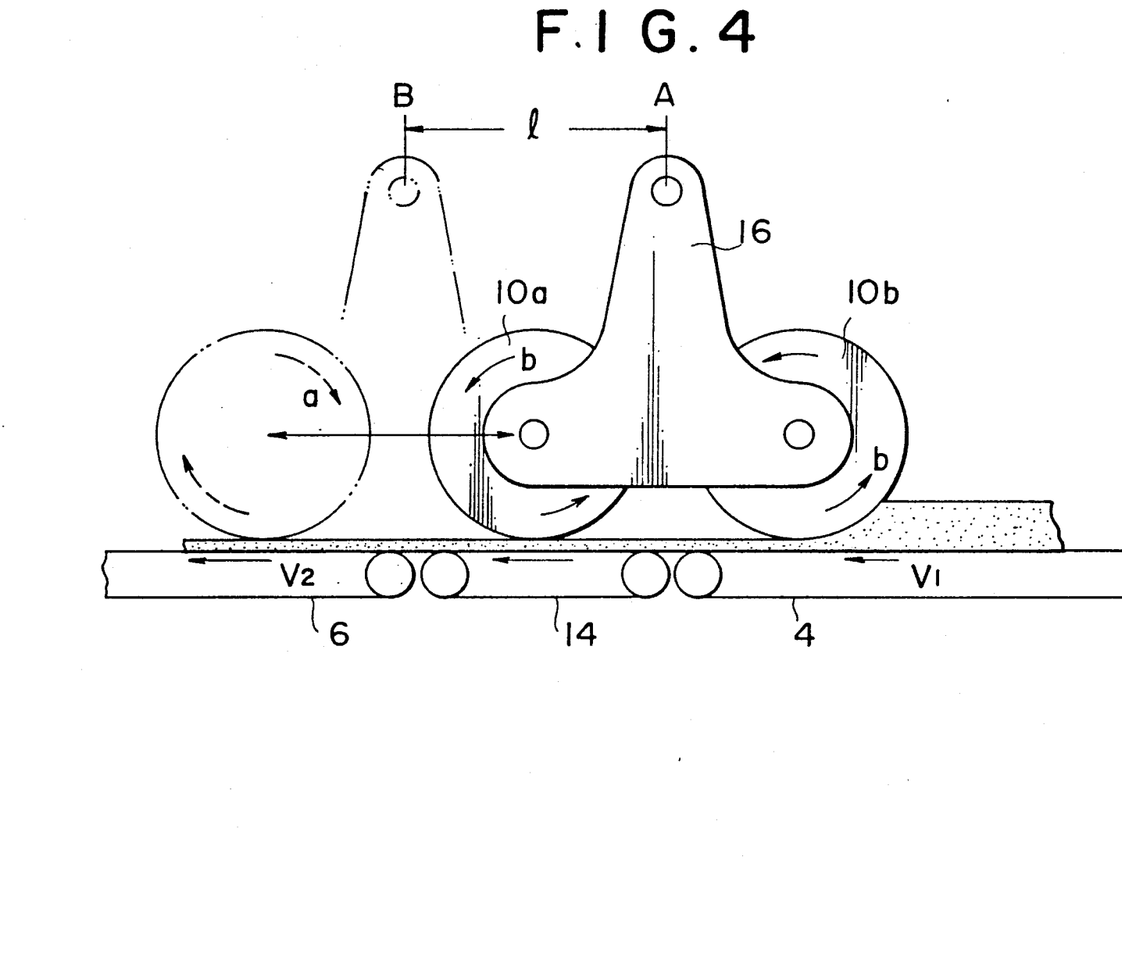
FIG. 4 is a schematic side-elevational view of a fourth embodiment of this invention.

A fourth embodiment of this invention is shown in FIG. 4. In it two rollers 10a, 10b are used. They are mounted on a frame 16 so that the roller 10a moves on the intermediate conveyor 14 and the downstream conveyor 6, and the roller 10b moves on the upstream conveyor 4 and the intermediate conveyor 14. The peripheral speed of the roller 10a is made to be the same as the conveying speed of the downstream conveyor 6, and the peripheral speed of the roller 10b is made to be the same as the conveying speed of the intermediate conveyor 14.

A fifth embodiment of this invention is shown in FIG. 7. In this embodiment the conveying surfaces of the upstream and intermediate conveyors are inclined relative to the horizonatl conveying surface of the downstream conveyor. Thus the dough on the upstream conveyor can smoothly enter the space between the roller and the upper conveying surfaces of the upstream conveyor and the intermediate conveyor.

By this embodiment, since the reciprocating distance l of a roller can be made small, the reciprocating strokes per unit time can be proportionately increased. This eventually contributes to the stretching effect and dough uniformity. Experiments show that dough for bread can be stretched to 1/10 of the thickness of the dough stretched by prior art devices.

By using a plurality of conveyors, each of which has a different speed, and a roller or rollers above the conveyors, plastic material, like dough for bread, that has a gluten structure, is effectively stretched, to obtain a thinly and uniformly stretched dough.

As explained above, this invention provides a simple method and a compact apparatus for effectively stretching plastic dough for bread to a predetermined thickness, without destroying its gluten structure. The invention makes it possible to stretch dough which is supplied to the conveyor and the thickness of which is not constant, to dough of a desired thickness, at a high production speed.

I claim:

1. A dough-stretching method comprising the steps of:
    disposing an upstream conveyor, and a downstream conveyor that is serially positioned relative to the upstream conveyor,
    driving the downstream conveyor faster than the upstream conveyor,
    disposing a roller above and spaced apart from the conveyors,
    forcibly rotating the roller at a rotational speed such that an average peripheral speed of the roller is equal to the conveying speed of the downstream conveyor, and reciprocating the roller a predetermined distance above a path stretching over the conveyors.

2. The method of claim 1, wherein the roller is rotated and driven at an average peripheral speed that is the same as that of the conveying speed of the downstream conveyor when the roller reciprocates.

3. The method of claim 1 further comprising the steps of first determining the clearance between the roller and the downstream conveyor and the speed of the downstream conveyor based on the desired thickness of the dough and the desired discharge speed, thereafter continuously measuring the thickness of the dough being supplied to the upstream conveyor, and changing the speed of the upstream conveyor based on the measured value to control the speed ratio between the upstream conveyor and the downstream conveyor.

4. The method of claim 2, further comprising the steps of first determining the clearance between the roller and the downstream conveyor and the speed of the downstream conveyor based on the desired thickness of the dough and the desired discharge speed, thereafter continuously measuring the thickness of the dough being supplied to the upstream conveyor, and changing the speed of the upstream conveyor based on the measured value to control the speed ratio between the upstream conveyor and the downstream conveyor.

5. A dough-stretching method comprising the steps of:
driving an upstream conveyor such that a first upper surface of the upstream conveyor travels at a first speed;
disposing a downstream conveyor such that a second upper surface of the downstream conveyor is substantially co-planar with the first upper surface;
driving the downstream conveyor such that the second upper surface travels at a second speed which is greater than the first speed;
reciprocating a roller adjacent the first and second upper surfaces such that a surface of the roller is at a predetermined distance from the first and second upper surfaces;
driving a roller driving means such that an average peripheral speed of the roller driving means is substantially the same as the second speed; and
connecting the roller to the roller driving means such that as the roller is reciprocated over the first and second surfaces, the surface of the roller is driven to rotate at an average speed substantially the same as the second speed.

* * * * *

UNITED STATES PATENT AND TRADEMARK OFFICE
CERTIFICATE OF CORRECTION

PATENT NO. : 5,154,941
DATED : October 13, 1992
INVENTOR(S) : Hayashi

It is certified that error appears in the above-indentified patent and that said Letters Patent is hereby corrected as shown below:

On the title page, Insert the following:

"Foreign Application Priority Data"

—July 28, 1989 [JP] Japan........................1-197786

Signed and Sealed this

Twelfth Day of October, 1993

*Attest:*

BRUCE LEHMAN

*Attesting Officer*    Commissioner of Patents and Trademarks